United States Patent [19]
Joseph et al.
[11] Patent Number: 4,824,215
[45] Date of Patent: Apr. 25, 1989

[54] LIQUID-CRYSTAL DISPLAY APPARATUS

[75] Inventors: Ezekiel Joseph; Gordon Kramer, both of Huntington Beach; Chan S. Oh, Diamond Bar, all of Calif.
[73] Assignee: Xtalite Technology Limited/La Technologie Xtalite Limitée, Charlottetown, Canada

[21] Appl. No.: 147,289
[22] Filed: Jan. 22, 1988
[51] Int. Cl.[4] ........ G02F 1/13
[52] U.S. Cl. ........ 350/339 D; 350/334; 350/336
[58] Field of Search ........ 350/339 D, 338, 334, 350/336

[56] References Cited

U.S. PATENT DOCUMENTS 4,212,010 7/1980 Walter ........ 340/784
4,408,836 10/1983 Kikuno ........ 350/334
4,744,638 3/1988 Ota et al. ........ 350/345

FOREIGN PATENT DOCUMENTS 994890 8/1976 Canada ........ 340/176
1050642 8/1979 Canada ........ 345/8
0241024 11/1985 Japan ........ 350/334

*Primary Examiner*—Stanley D. Miller
*Assistant Examiner*—Anita E. Pellman

[57] ABSTRACT

Large electronic signs usually employ either incandescent lights or magnetically manipulated elements. A simple alternative includes a plurality of juxtaposed modules on a transparent diffuser plate, each module being defined by a base plate, a top plate and a conductive, liquid crystal coating layer between the plates; transparent electrical contacts in the area of overhang between the top plate and the diffuser plate, and thin wires extending through the diffuser plate for carrying current to the contacts.

8 Claims, 2 Drawing Sheets

LIQUID CRYSTAL DISPLAY APPARATUS

BACKGROUND OF THE INVENTION

1. Field of the Invention

This invention relates to a liquid crystal display apparatus.

2. Discussion of the Prior Art

In general, large scale electronic signs employ either incandescent lights or magnetically manipulated elements for forming a variety of patterns or displays. Incandescent lights consume large quantities of power, and both of the systems require massive supporting structures. The net results is that both types of systems are somewhat expensive. The present inventors have found that an at least equally effective and much less expensive alternative resides in a liquid display apparatus.

Liquid display apparatuses are by no means new. Examples of such apparatuses are found, for example in Canadian Pat. Nos. 994,890, which issued to Gordon W. Hickman on Aug. 10, 1976 and 1,050,642, which issued to Werner E. L. Haas et al on Mar. 13, 1979, and U.S. Pat. Nos. 4,212,010, which issued to Karl H. Walter on July 8, 1980 and 4,408,836, which issued to Masayuki Kikuno on Oct. 11, 1983. The patented inventions are typical of the art in the field of the present invention. The patented inventions rely on separate controls for actuating separate display elements, or on matrix systems, in which rows and columns of a conductor matrix are actuated to switch liquid crystals between different optical states. Perhaps the most interesting of the patents (from the point of view of the present inventors) is the Kikuno U.S. Pat. No. 4,408,836 which teaches the use of a plurality of individual and discrete liquid display cells each having two plates which are perpendicular to each other to form extensions for overlapping portions of adjacent cells.

Problems inherent to the Kikuno and other prior art devices are dark areas, i.e. areas containing conductors or other hardware which results in a discontinuous display. If liquid display crystals are to be used in large assemblies such as advertising signs, it is important that the whole visible portion of the sign be usable, i.e. that the pattern or letters being displayed be shadow free. It has been found that this problem is not solved by the prior art devices.

The object of the present invention is to overcome the problems experienced with existing display systems by providing a relatively simple liquid crystal display apparatus, which is inexpensive to produce, and which can be used to produce clear patterns for displays in large scale electronic signs.

GENERAL DESCRIPTION OF THE INVENTION

Accordingly, the present invention relates to a liquid crystal display apparatus comprising a plurality of individual liquid crystal modules in juxtaposed relationship to define a planar display; each said module including base plate means; top plate means and a conductive liquid crystal coating layer between said plate means, one edge of said top plate means extending beyond a corresponding edge of said base plate means.

BRIEF DESCRIPTION OF DRAWINGS

The invention will be described in greater detail with reference to the accompanying drawings, which illustrate preferred embodiments of the invention, and wherein.

Figure 1:
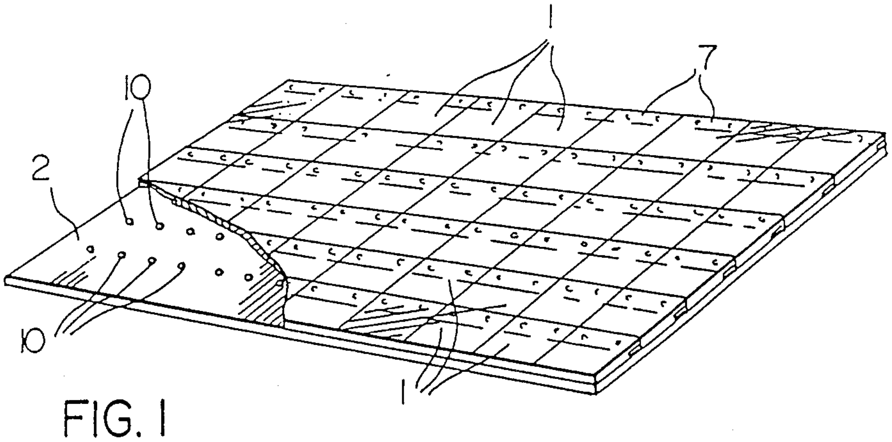
FIG. 1 is a schematic, partly sectioned, perspective view of a liquid crystal display apparatus in accordance with the present invention.

It will be noted that some of the drawings are partly exploded to facilitate illustration of the apparatus, and in some cases parts have been omitted. However, it will be appreciated that plates, which are shown as separated in the drawings will, in fact, be abutting.

DESCRIPTION OF PREFERRED EMBODIMENTS

With reference to FIG. 1, the basic form of the apparatus includes a plurality of individual liquid crystal cells or modules 1 mounted in side by side relationship on a base or diffuser plate 2, which takes the form of a printed circuit board. As shown in FIGS. 2 to 5, each individual module 1 is defined by a rectangular base plate 3, a rectangular top plate 4 and a thin conductive coating layer (not shown) in the area 5 where the plates 3 and 4 are in contact. The plates 3 and 4 are coextensive, except along one edge 6 of the base plate 3, where a rectangular portion 7 of the top plate 4 extends outwardly beyond such edge 6. The cells 1 are connected to the diffuser plate 2 by a transparent adhesive (not shown).

Figure 2:
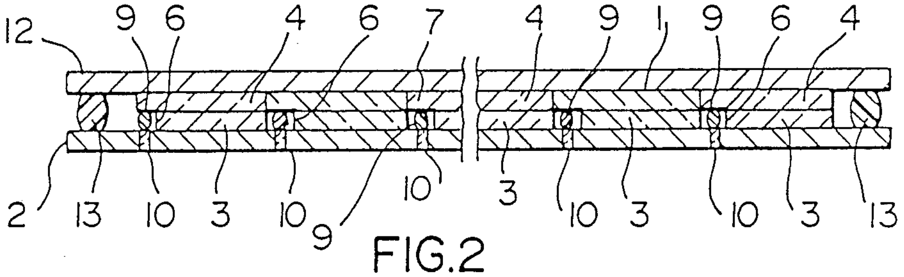
FIG. 2 is a cross section of a second embodiment of the invention.
Figure 3:
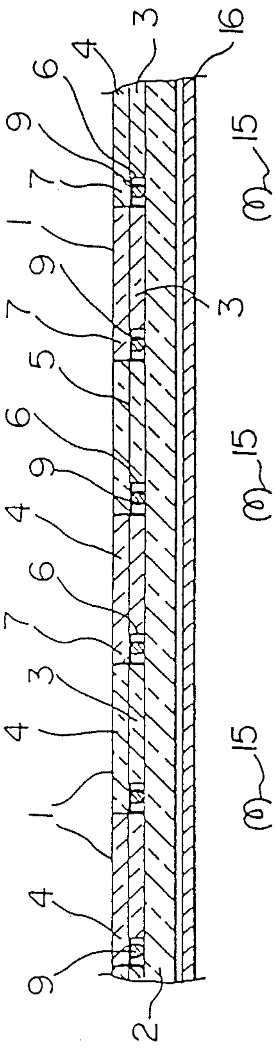
FIGS. 3 to 5 are cross sections of additional embodiments of the present invention.

The diffuser plate 2 is a transparent substrate for carrying the individual liquid crystal modules 1. A transparent pattern of conductors (not shown) is provided on the bottom surface of the plate 2. The conductors of the transparent pattern are connected to the liquid crystal display modules 1 by contacts 9 beneath the portions 7 of the top plates 4 which extend beyond or overhang the bottom plates 3. The contacts 9 are defined by drops of conductive cement, which in turn are connected to fine wires 10 extending through the diffuser plate 2 (FIG. 2).

A second embodiment of the invention (FIG. 2) includes all of the elements described above and a glass top plate 12, which is connected to the plate 2 by edge seals 13. The plate 12 protects the modules 1.

A third embodiment of the invention (FIG. 3) includes the liquid crystal display modules 1 mounted on a plate 2 for backlighting by lights 15, and a layer 16 of a fluorescent dye beneath the plate 2. The dye emits colored light when illuminated. The dye layer 16 may be incorporated directly into the diffuser plate 2, painted onto the surface of the plate 2 or be incorporated in a separate element.

Figure 4:
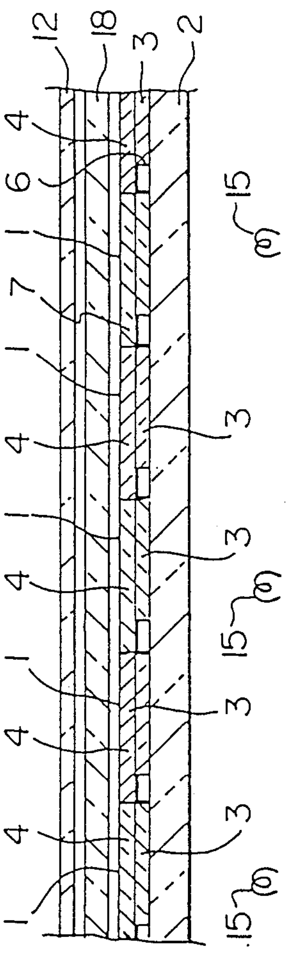
Figure 5:
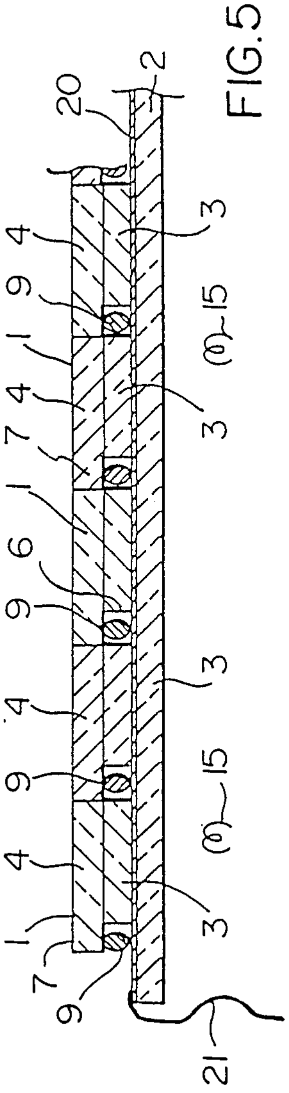

Referring to FIG. 4, a fourth embodiment of the invention includes the display modules 1, a diffuser plate 2 beneath such module 1, an optical expander or lens 18, a top plate 12 and lights 15. The lens 18 can be an array of small lenses or a Fresnel lens.

A fifth embodiment of the invention includes the display modules 1, which are mounted on a diffuser plate 2, with a transparent electrode pattern 20 sandwiched between the modules 1 and the plate 2. Conductive cement contacts 9 are used to make electrical connection between the modules 1 and the transparent conductor pattern 20. The pattern 20 extends to the edge of the diffuser plate 2. Current is carried to the pattern 20 by a flexible tape cable connector 21 on one side of the device. When several plates 2 are juxtaposed, electrical edge connections can be made using commercially available, flexible tape connectors.

In use, with a light source 15 behind the plate 2, the latter acts as a support for the liquid crystal display modules 1, and as a diffuser for scattering the light from the light source 15. By actuating selected modules 1, a continuous pattern can be created with no visible breaks therein. The fine wires 10 are not visible from the front or viewing side of the plate because the plate 2 scatters the light sufficiently that no shadows of the wires are created. The modules 1 and plates 2 can be used to create large liquid display systems.

The conductive cement defining the contacts 9 can be a clear, colorless adhesive containing a small, solid sphere of a conductive metal such as copper or aluminum. The sphere diameter should be equal to the thickness of the plate 3. The spheres provide a mechanical support for the edge 6 of the top plate 3, and the conductive cement is only required to provide good electrical contact between the surface of the spheres and the elements to which the spheres are adhered.

We claim:

1. A liquid crystal display apparatus comprising a plurality of individual liquid crystal modules in juxtaposed relationship to define a planar display, each said module including base plate means; top plate means and a conductive liquid crystal coating layer between said plate means, one edge of said top plate means extending beyond a corresponding edge of said base plate means, the remainder of the top plate means being coterminous with said bottom plate means; diffuser plate means carrying said modules for scattering light passing through or reflected by the diffuser plate means; and electrically conductive contact means extending between said one edge of said top plate and said diffuser plate means for conducting electrical current to each said module.

2. An apparatus according to claim 1, including transparent cover plate means covering all said modules.

3. An apparatus according to claim 1, including a layer of fluorescent dye beneath said diffuser plate means.

4. An apparatus according to claim 1, including lens means on said modules for redirecting light therefrom.

5. An apparatus according to claim 1 including transparent conductor means sandwiched between said modules and said diffuser plate means for carrying electrical current to said contact means.

6. An apparatus according to claim 1, including fine conductor means extending through said diffuser plate means for carrying electrical current to said contact means.

7. An apparatus according to claim 6, wherein said contact means is transparent.

8. An apparatus according to claim 6, including conductive pattern means sandwiched between said modules and said diffuser plate means, and in electrical contact with said contact means and said conductor means.

* * * * *